United States Patent [19]
Yazaki et al.

[11] Patent Number: 5,174,848
[45] Date of Patent: Dec. 29, 1992

[54] PROCESS FOR PRODUCING PROPYLENE RESIN FORMED ARTICLES WITH HARD COAT

[75] Inventors: Takao Yazaki; Masataka Noro; Takashi Matsui; Kazuhide Hayama; Noritaka Hosokawa, all of Mie, Japan

[73] Assignee: Mitsubishi Petrochemical Co., Ltd., Tokyo, Japan

[21] Appl. No.: 678,239

[22] Filed: Apr. 1, 1991

[30] Foreign Application Priority Data

Apr. 9, 1990 [JP] Japan ................................. 2-93748

[51] Int. Cl.⁵ ............................................. B29C 43/02
[52] U.S. Cl. ................................... 156/242; 156/245; 156/272.6; 156/275.5; 427/517; 428/516; 428/517; 428/519; 428/521
[58] Field of Search .................. 156/242, 244.24, 245, 156/272.6, 275.5; 427/54.1; 428/482, 483, 516, 517, 519, 521

[56] References Cited

U.S. PATENT DOCUMENTS

| | | |
|---|---|---|
| 3,600,487 | 8/1971 | Zavisnik . |
| 4,720,420 | 1/1988 | Crass et al. ...................... 156/244.24 |
| 5,028,480 | 7/1991 | Dean .................................. 428/516 |
| 5,089,291 | 2/1992 | Hayama et al. ..................... 428/516 |
| 5,102,488 | 4/1992 | Hayama et al. ................... 156/275.5 |

FOREIGN PATENT DOCUMENTS 0324483  7/1989  European Pat. Off. .

OTHER PUBLICATIONS

World Patents Index Latest, Derwent Publications Ltd., London, GB; AN 86-085920 (13) & JP-A-61 034 039 (Tokuyama Soda KK) *abstract*.
Kobunshi Ronbunshu, vol. 46, No. 1, pp. 45-49, Jan. 1989.
Journal of Materials Science Letters, vol. 8, pp. 675-677, 1989, Y. Xu, et al., "Epitaxial Crystallization of Polyoctenamer on Uniaxially Oriented Polypropylene Films".

*Primary Examiner*—Caleb Weston
*Attorney, Agent, or Firm*—Oblon, Spivak, McClelland, Maier & Neustadt

[57] ABSTRACT

A process for producing a propylene resin formed article with a hard coat is disclosed, comprising forming an ultraviolet-curing acrylic resin coating film on the surface of a propylene resin film or sheet, subjecting the film or sheet with the coating film to thermoforming, and irradiating the coating film to ultraviolet rays to cure said ultraviolet-curing resin, wherein said propylene resin film or sheet is composed of at least a propylene resin surface layer containing substantially no nucleating agent on which surface is coated said acrylic resin film and a thermoplastic resin base layer containing a nucleating agent which is laminated on the other side of said propylene resin surface layer prior to the thermoforming. The hard coat on the propylene resin formed article has high gloss.

7 Claims, 2 Drawing Sheets

PROCESS FOR PRODUCING PROPYLENE RESIN FORMED ARTICLES WITH HARD COAT

FIELD OF THE INVENTION

This invention relates to a process for producing propylene resin formed articles having a highly glossy hard coat which are particularly applicable to production of exterior and interior parts of automobiles, appliances, etc.

BACKGROUND OF THE INVENTION

Propylene resins are of wide use in various industrial parts in automobiles, appliances, etc. because of their lightweight, processability and the like. For particular applications where scratch resistance is required, such as exterior and interior parts, propylene resin formed articles can be endowed with scratch resistance by forming a hard coat comprising an ultraviolet-curing acrylic resin.

The inventors previously proposed a process for producing such propylene resin formed articles with a hard coat as disclosed in JP-A-1-180338 (the term "JP-A" as used herein means an "unexamined published Japanese patent application"), in which a coating film comprising an ultraviolet-curing acrylic resin is formed on a propylene resin film or sheet and, after a desired forming step such as laminate molding and/or thermoforming, the coating film is irradiated with ultraviolet rays to cure the ultraviolet-curing acrylic resin.

In the course of further studies on the above-described process, however, the inventors were confronted with the problem that the hard coat on propylene resin formed articles having been subjected to thermoforming has considerably reduced gloss. This turned out to be a problem inherent to the above-mentioned specific process, which never occurs in conventional techniques in which a coating film of an ultraviolet-curing resin is formed on a thermoformed article and then irradiated with ultraviolet rays to provide a hard coat.

SUMMARY OF THE INVENTION

The inventors have studied to solve the above-described problem associated with their previous proposal.

Accordingly, an object of the present invention is to provide a process for producing a propylene resin formed article having a highly glossy hard coat.

The present invention relates to a process for producing a shaped propylene resin article with a hard coat comprising coating an ultraviolet-curing acrylic resin film on the surface of a propylene resin film or sheet, subjecting the film or sheet with the coated film to thermoforming, and irradiating the coated film with ultraviolet rays to cure said ultraviolet-curing resin, wherein said propylene resin film or sheet is composed of at least a propylene resin surface layer containing substantially no nucleating agent on which surface is coated said acrylic resin film and a thermoplastic resin base layer containing a nucleating agent which is laminated on the other side of said propylene resin surface layer prior to the thermoforming.

DETAILED DESCRIPTION OF THE INVENTION

Figure 1:
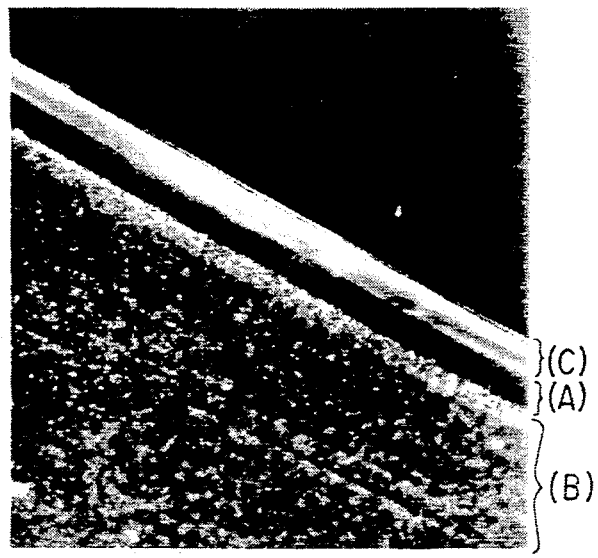
FIGS. 1 to 3 each shows a micrograph of the laminated sheet obtained in Example 2 from which an ultraviolet-curing acrylic resin layer had been removed, in which FIGS. 1 and 2 (100X magnification) show the cross section of the laminated sheet before vacuum forming and after vacuum forming, respectively, and FIG. 3 (6000X magnification) shows the surface of the propylene resin surface layer after vacuum forming.

The propylene resin surface layer which can be used in the present invention is a film or sheet containing substantially no nucleating agent which is obtained by molding a propylene homopolymer, a copolymer of propylene and an o-olefin, e.g., ethylene and butene-1, and these homo- and copolymers modified with maleic anhydride, etc.

The ultraviolet-curing acrylic resin which can be used in the present invention typically includes (I) a composition comprising a thermoplastic acrylic resin, a photopolymerization initiator, and an acrylic polymerizable monomer or (II) a composition comprising an acrylic resin having an acryloyl group or methacryloyl group, a photopolymerization initiator and, if desired, an acrylic polymerizable monomer.

Examples of suitable acrylic resins are homopolymers of methyl methacrylate, ethyl methacrylate, butyl methacrylate, etc.; copolymers of such a monomer and (meth)acrylic acid (the term "(meth)acrylic acid" as used herein means acrylic acid and methacrylic acid inclusively), methyl acrylate, ethyl acrylate, butyl acrylate, 2-ethylhexyl (meth)acrylate (the term "(meth)acrylate" as used herein means acrylate and methacrylate inclusively), lauryl (meth)acrylate, stearyl (meth)acrylate, cyclohexyl (meth)acrylate, benzyl (meth)acrylate, glycidyl (meth)acrylate, 2-hydroxyethyl (meth)acrylate, 2-hydroxypropyl (meth)acrylate, etc.

Examples of suitable acrylic resins having an acryloyl group or methacryloyl group include the above-mentioned polymers modified by introducing a (meth)acryloyl group (the term "(meth)acryloyl" as used herein means acryloyl and methacryloyl inclusively) into the side chain thereof, such as those having introduced thereto epoxy (meth)acrylate which are obtained by addition reaction of (meth)acrylic acid to methyl methacrylate-glycidyl (meth)acrylate copolymers or addition reaction of glycidyl (meth)acrylate to methyl methacrylate(meth)acrylic acid copolymers, and those having introduced thereto urethane (meth)acrylate by addition reaction between methyl methacrylate-2-hydroxyethyl (meth)acrylate copolymers and a reaction product of tolylene diisocyanate or isophorone diisocyanate and an equimolar amount of 2-hydroxyethyl (meth)acrylate.

Examples of suitable photopolymerization initiators are benzoin methyl ether, benzoin ethyl ether, benzoin isopropyl ether, benzoin butyl ether, diethoxyacetophenone, benzyl dimethyl ketal, 2-hydroxy-2-methylpropiophenone, 1-hydroxycyclohexyl phenyl ketone, benzophenone, Michler's ketone, isoamyl N,N-dimethylaminobenzoate, 2-chlorothioxanthone, and 2,4-diethylthioxanthone.

Examples of suitable acrylic polymerizable monomers include monofunctional acrylates, e.g., 2-methoxyethyl acrylate, 2-ethoxyethyl acrylate, 2-phenoxyethyl acrylate, ethoxydiethylene glycol acrylate, phenoxydiethylene glycol acrylate, a nonylphenol-ethylene oxide adduct acrylate, nonylphenolpropylene oxide adduct acrylate, benzyl acrylate, cyclohexyl acrylate, tetrahydrofurfuryl acrylate, dicyclopentenyl acrylate, dicyclopetenyloxyethyl acrylate, 2-hydroxy-3-phenoxypropyl acrylate, 2-hydroxyethyl acrylate, and 2-hydroxypropyl acrylate; and polyfunctional acrylates, e.g., 1,4-butanediol diacrylate, neopentyl glycol diacrylate, 1,6-hexanediol diacrylate, 2,2-bis[4-(acryloyloxydiethoxy)phenyl]propane, bis(acryloyloxyethyl)-hyiroxyethyl isocyanurate, tricyclodecanedimethyl diacrylate, trimethylolpropane triacrylate, pentaerythritol triacrylate, trimethylolpropanepropylene oxide adduct triacrylate, tris(acryloyloxyethyl) isocyanurate, pentaerythritol tetraacrylate, dipentaerythritol pentaacrylate, dipentaerythritol hexaacrylate, and dipentaerythritol-caprolactone adduct acrylate.

The ultraviolet-curing acrylic resin composition (I) comprises from 35 to 80% by weight of a thermoplastic acrylic resin and from 20 to 65% by weight of an acrylic polymerizable monomer based on the total resinous components, and from 0.1 to 5 parts by weight of a photopolymerization initiator per 100 parts by weight of the total resinous components.

The ultraviolet-curing acrylic resin composition (II) comprises from 35 to 100% by weight of an acrylic resin having an acryloyl group or a methacryloyl group and up to 65% by weight of an acrylic polymerizable monomer based on the total resinous components, and from 0.1 to 5 parts by weight of a photopolymerization initiator per 100 parts by weight of the total resinous components.

A coating film of the ultraviolet-curing acrylic resin can be formed by coating a solution of the above-described ultraviolet-curing acrylic resin in a solvent on the surface of the above-described propylene resin film or sheet which, if desired, has been subjected to a pretreatment such as washing, etching, corona discharge, etc. by roll coating, die coating, or the like technique to a dry (solvent-free) thickness of from 1 to 50 μm, and preferably from 3 to 30 μm, followed by heating to remove the solvent. Examples of suitable solvents include aromatic hydrocarbons, e.g., benzene, toluene, and xylene; halogenated hydrocarbons, e.g., chloroform and ethylene dichloride; esters, e.g., methyl acetate, ethyl acetate, and butyl acetate; ketones, e.g., acetone, methyl ethyl ketone, and methyl isobutyl ketone; and ethers, e.g., dioxane and cellosolve.

The propylene resin film or sheet with the thus formed coating film is then subjected to thermoforming and then irradiated with ultraviolet rays to cure the ultraviolet-curing resin.

The thermoforming is a step of forming by means of a forming machine to which a desired forming mold is fixed, e.g., a vacuum forming machine, a pressure forming machine, a vacuum and pressure forming machine, a heating plate pressure forming machine, and a stamping machine, etc.

Apparatus which can be used for ultraviolet irradiation include a xenon lamp, a low-pressure mercury lamp, a high-pressure mercury lamp, a ultra-high-pressure mercury lamp, a carbon arc lamp, a tungsten lamp, and a halogen lamp.

In the present invention, it is essential that the propylene resin film or sheet is a laminate composed of at least a propylene resin surface layer containing substantially no nucleating agent with a coated film of an ultraviolet-curing acrylic resin on the one side and a thermoplastic resin base layer containing a nucleating agent which is laminated on the other side of the propylene resin surface layer prior to the thermoforming. Otherwise, a hard coat obtained by ultraviolet irradiation has markedly reduced gloss. The thermoplastic resin base layer may have a laminate structure composed of a resin layer containing a nucleating agent and a resin layer containing no nucleating agent, provided that the nucleating agent-containing resin layer be in contact with the propylene resin surface layer.

The thermoplastic resin base layer is laminated on the other side of the propylene resin surface layer, for example, by an extrusion coating or co-extrusion coating method in which a thermoplastic resin is melt-kneaded in an extruder, extruded from a T die in a single or multi-layer film or sheet and adhered to the other side of the propylene resin surface layer through a pair of pressure rolls or by a dry laminating method in which a previously molded thermoplastic resin film or sheet is adhered to the other side of the propylene resin surface layer with an adhesive.

In the resulting thermoformed article, the crystalline region of the propylene resin surface layer consists of trans crystals but not spherulites which are generally observed in crystalline polymers. Such a trans crystal structure of the propylene resin is believed to contribute to high gloss of the resulting hard coat surface.

Propylene resin crystals generally have a spherical crystal structure (spherulite) which is formed through growth of lamellae to three dimensional directions at the same rate. On the other hand, the "trans crystal structure" as referred to herein is known as one of crystal structures of propylene resins which is formed through epitaxial unidirectional growth of lamellae (see *Kobunshi Ronbunshu,* Vol. 46, No. 1, pp. 45–50 (January, 1989) and *Journal of Materials Science Letters,* Vol. 8, pp. 675–677 (1989)).

The thermoplastic resin base layer which is laminated on the other side of the propylene resin surface layer is preferably a propylene resin. The nucleating agent which can be incorporated into the thermoplastic resin includes metal salts of aromatic carboxylic acids (e.g., benzoic acid), e.g., aluminum benzoate, aluminum p-t-butylbenzoate, basic aluminum dibenzoate, basic aluminum di(p-t-butylbenzoate), and sodium p-t-butylbenzoate; metal salts of aromatic phosphoric esters, e.g., sodium di(4-t-butylphenyl)phosphate; and condensation products between a polyhydric alcohol (e.g., sorbitol) and an aldehyde (e.g., benzaldehyde), e.g., dibenzylidene sorbitol, di-p-methylbenzylidene sorbitol, di-p-ethylbenzylidene sorbitol, di-p-isopropylbenzylidene sorbitol, di-p-chlorobenzylidene sorbitol, p-methylbenzylidene-p-ethylbenzylidene sorbitol, p-methylbenzylidene-p-isopropylbenzylidene sorbitol, p-methylbenzylidene-p-chlorobenzylidene sorbitol, p-ethylbenzylidene-p-isopropylbenzylidene sorbitol, p-ethylbenzylidene-p-chlorobenzylidene sorbitol, and p-isopropylbenzylidene-p-chlorobenzylidene sorbitol. Preferred of these nucleating agents are aluminum hydroxy-di(p-t-butylbenzoate) and dibenzylidene sorbitol.

A preferred content of the nucleating agent in the thermoplastic resin is from 0.01 to 1% by weight.

The ultraviolet-curing acrylic resin layer has a thickness of from 1 to 50 μm, and preferably from 3 to 30 μm. The propylene resin surface layer has a thickness of from 5 to 5000 μm, and preferably from 20 to 300 μm. The thermoplastic resin base layer has a thickness of from 5 to 5000 μm, and preferably from 500 to 5000 μm. The film or sheet thickness of these layers can be selected appropriately depending on the final use.

According to the present invention, the problem of deteriorated gloss of a hard coat which is associated with the previously proposed processes can be settled by using a propylene resin surface layer containing substantially no nucleating agent with a coated film of an ultraviolet-curing acrylic resin on the one side and by laminating a nucleating agent-containing thermoplastic resin base layer on the other side of the propylene resin surface layer prior to thermoforming.

The present invention is now illustrated in greater detail with reference to the following Examples, but it should be understood that the present invention is not deemed to be limited thereto. All the parts, and ratios are by weight unless otherwise specified.

EXAMPLE 1

A coating solution consisting of 100 parts of polymethyl methacrylate, 4 parts of benzyl dimethyl ketal, 40 parts of dipentaerythritol hexaacrylate, 10 parts of neopentyl glycol diacrylate, and 200 parts of toluene was coated with a roll coater on the one surface of a 100 μm thick polypropylene film (C), the surface having been subjected to a corona discharge treatment. The coating was freed of the solvent by heating to form a 15 μm thick ultraviolet-curing acrylic resin coating film. Subsequently, (A) polypropylene (melting point 164° C.) containing 0.15 wt % of aluminum hydroxy-di(p-t-butylbenzoate) and (B) a resin composition comprising 30 wt % of polypropylene, 45 wt % of polyethylene (density: 0.950 g/cm$^3$), and 25 wt % of talc (average particle size: 5 μm) were co-extruded into sheet and adhered to the other side of the polypropylene film (C) having formed thereon the coating film through a pair of pressure rolls with the layer of resin composition (B) as the external layer (layer (A) thickness: 100 μm; layer (B) thickness: 2.8 mm).

The resulting laminated sheet was heated to a surface temperature of 170° C. and formed in a vacuum forming machine to which a forming mold of 200 mm in width, 150 mm in length, and 80 mm in height was fixed at a planar draft of 2.87.

The resulting formed article was irradiated with ultraviolet rays emitted from a high-pressure mercury lamp (output: 2 kW; output density: 80 W/cm) while being conveyed at a speed of 0.8 m/min to cure the ultraviolet-curing resin. There was obtained a propylene resin rectangular container having a hard coat on the outer surface thereof.

The polypropylene crystal adjacent to the hard coat had a trans crystal structure. The hard coat had a pencil hardness of 2 H and a surface gloss of 71% (measured according to ASTM D 2457-70 at 60°, hereinafter the same).

EXAMPLE 2

A coating solution consisting of 100 parts of polymethyl methacrylate, 4 parts of benzyl dimethyl ketal, 40 parts of dipentaerythritol hexaacrylate, 10 parts of neopentyl glycol diacrylate and 200 parts of toluene was coated with a roll coater on the one surface of a 100 μm thick polypropylene film (C), the surface having been subjected to a corona discharge treatment. The coating was freed of the solvent by heating to form a 15 μm thick ultraviolet-curing acrylic resin coating film. Subsequently, (A) polypropylene containing 0.1 wt % of aluminum hydroxy-di(p-t-butylbenzoate) and (B) a resin composition comprising 68 wt % of polypropylene and 32 wt % of polyethylene (density: 0.950 g/cm$^3$) were co-extruded into sheet and adhered to the other side of the polypropylene film (C) having formed thereon the coating film through a pair of pressure rolls with the layer of resin composition (B) as the external layer (layer (A) thickness: 100 μm; layer (B) thickness: 2.8 mm).

The resulting laminated sheet was heated to a surface temperature of 175° C. and formed in a vacuum forming machine to which a forming mold of 200 mm in width, 150 mm in length, and 80 mm in height was fixed at a planar draft of 2.87.

The resulting formed article was irradiated with ultraviolet rays emitted from a high-pressure mercury lamp (output: 2 kW; output density: 80 W/cm) while being conveyed at a speed of 0.8 m/min to cure the ultraviolet-curing resin. There was obtained a propylene resin rectangular container having a hard coat on the outer surface thereof.

The polypropylene crystal adjacent to the hard coat had a trans crystal structure. The hard coat had a pencil hardness of H and a surface gloss of 60%.

Figure 2:
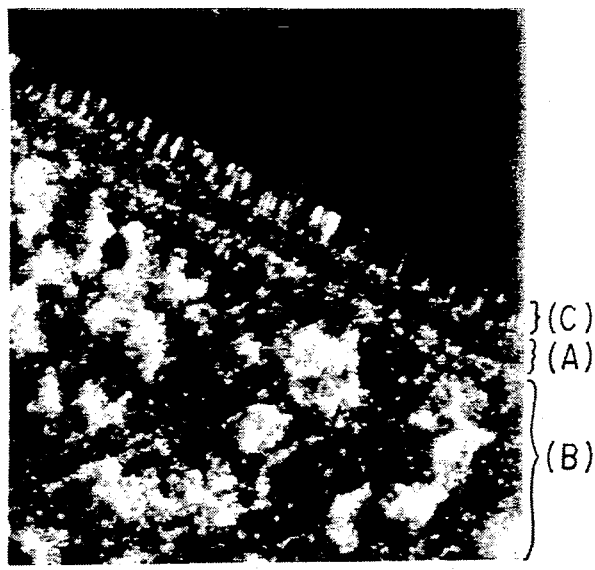
Figure 3:
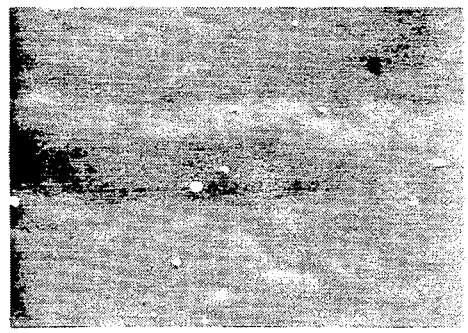

FIGS. 1 to 3 each shows a micrograph of the above-prepared laminated sheet from which the ultraviolet-curing acrylic resin layer had been, removed. FIGS. 1 and 2 are micrographs (100X magnification) of the cross section of the laminated sheet before vacuum forming and after vacuum forming, respectively. The micrograph of FIG. 2 reveals development of a trans crystal structure in the propylene resin surface layer (C) and development of large spherulites in the external base layer (B). FIG. 3 is an electron micrograph (6000X magnification) of the surface of the propylene resin surface layer (C) after vacuum forming.

EXAMPLE 3

A propylene resin rectangular container with a hard coat on the outer surface thereof was produced in the same manner as in Example 2, except for using the following composition as the ultraviolet-curing acrylic resin.

The hard coat of the resulting formed article had a pencil hardness of 2 H and a surface gloss of 62%.

Ultraviolet-Curing Acrylic Resin Composition

A mixture of 90 parts of methyl methacrylate, 10 parts of glycidyl methacrylate, and 105 parts of toluene was heated to 80° C. At the point when the temperature reached 80° C. and after 2 hours and 4 hours from that point, azobisisobutyronitrile was added to the polymerization system in an amount of 0.15 part for each addition, and the system was allowed to react at 80° C. for an overall period of 6 hours. After the reaction mixture was heated, to 110° C., 5 parts of acrylic acid, 0.5 part of tetramethyl ammonium bromide, 0.05 part of hydroquinone monomethyl ether were added thereto, and the system was allowed to react at 110° C. for an overall period of 6 hours. There was obtained a 50 wt % toluene solution of a methacrylic ester copolymer modified with an acryloyl group introduced into the side chain thereof.

A hundred parts of the resulting polymer solution were mixed with 30 parts of dipentaerythritol hexaacrylate, 130 parts of toluene, and 2 parts of 1-hydroxycyclohexyl phenyl ketone to prepare an ultraviolet-curing acrylic resin composition.

EXAMPLE 4

A propylene resin rectangular container with a hard coat on the outer surface thereof was produced in the same manner as in Example 3, except for replacing 0.1 wt % of aluminum hydroxy-di(p-t-butylbenzoate) in the polypropylene (A) with 0.15 wt % of dibenzylidene sorbitol. The hard coat of the resulting formed article had a pencil hardness of 2 H and a surface gloss of 71%.

COMPARATIVE EXAMPLE 1

A propylene resin rectangular container having a hard coat on the outer surface thereof was produced in the same manner as in Example 1, except for using polypropylene (A) containing no aluminum hydroxy-di(p-t-butylbenzoate).

The polypropylene polymer adjacent to the hard coat showed a spherical crystal structure. The hard coat had a pencil hardness of 2 H but a markedly low surface gloss of 18%.

COMPARATIVE EXAMPLE 2

A propylene resin rectangular container having a hard coat on the outer surface thereof was produced in the same manner as in Example 2, except that the polypropylene containing aluminum hydroxy-di(p-t-butylbenzoate) (A) was not used. The hard coat of the resulting formed article had a pencil hardness of 2 H but a considerably deteriorated surface gloss as low as 18%.

Figure 4:
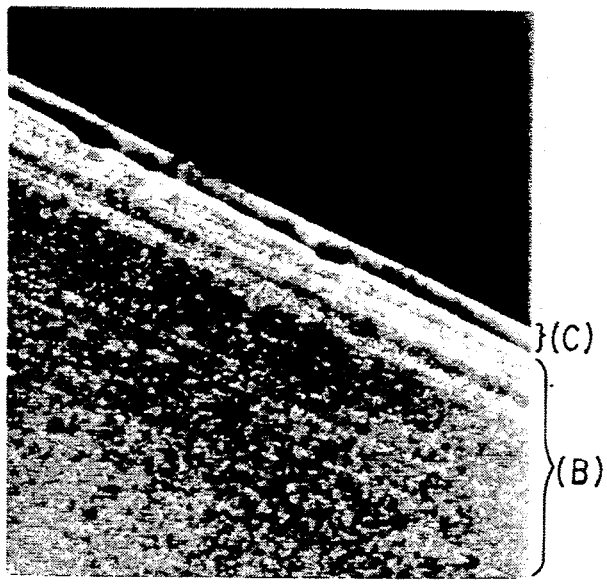
FIGS. 4 to 6 each shows a micrograph of the laminated sheet obtained in Comparative Example 2 from which an ultraviolet-curing acrylic resin layer had been removed, in which FIGS. 4 and 5 (100X magnification) show the cross section of the laminated sheet before vacuum forming and after vacuum forming, respectively, and FIG. 6 (150X magnification) shows the surface of the propylene resin surface layer after vacuum forming.
Figure 5:
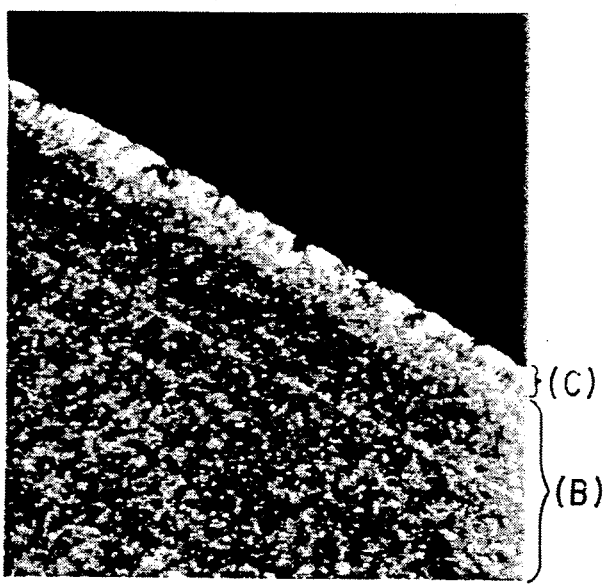
Figure 6:

FIGS. 4 to 6 each shows a micrograph of the above-prepared laminated sheet from which the ultraviolet-curing acrylic resin layer had been removed. FIGS. 4 and 5 are micrographs (100X magnification) of the cross section of the laminated sheet before vacuum forming and after vacuum forming, respectively, and FIG. 6 is a micrograph (150X magnification) of the surface of the propylene resin surface layer (C) after vacuum forming. As can be seen from FIGS. 5 and 6, development of spherulites is observed in the propylene resin surface layer (C) in contact with the hard coat. The boundaries among the spherulites are clearly seen in FIG. 6 even at a magnification of 150. In the electron micrograph of FIG. 3 in Example 2, to the contrary, crystal boundaries are not clear even at a magnification of 6000.

From these considerations, the excellent gloss of the hard coat formed by the present invention is believed to be ascribed to the trans crystal structure of the propylene resin surface layer (C).

While the invention has been described in detail and with reference to specific examples thereof, it will be apparent to one skilled in the art that various changes and modifications can be made therein without departing from the spirit and scope thereof.

What is claimed is:

1. A process for producing a shaped propylene resin article with a hard coat comprising coating an ultraviolet curing acrylic resin film on the surface of a propylene resin film or sheet, subjecting the film or sheet with the coated film to thermoforming, and irradiating the coated film with ultraviolet rays to cure said ultraviolet-curing resin, wherein said propylene resin film or sheet is composed of at least a propylene resin surface layer containing substantially no nucleating agent on which surface is coated said acrylic resin film and a thermoplastic resin base layer containing a nucleating agent which is laminated on the other side of said propylene resin surface layer prior to the thermoforming.

2. A process as claimed in claim 1, wherein said thermoplastic resin is a propylene resin.

3. A process as claimed in claim 1, wherein said nucleating agent in the thermoplastic resin base layer is aluminum hydroxy-di(p-t-butylbenzoate) or dibenzylidene sorbitol.

4. A process as claimed in claim 1, wherein said nucleating agent is present in the thermoplastic resin base layer in an amount of from 0.01 to 1% by weight.

5. A process as claimed in claim 1, wherein crystallites of the propylene resin in the propylene resin film or sheet of the shaped propylene resin sheet with a hard coat have a trans crystal structure.

6. A process as claimed in claim 1, wherein said ultraviolet-curing acrylic resin comprises from 35 to 80% by weight of a thermoplastic acrylic resin and from 20 to 65% by weight of an acrylic polymerizable monomer based on the total resinous components, and from 0.1 to 5 parts by weight of a photopolymerization initiator per 100 parts by weight of the total resinous components.

7. A process as claimed in claim 1, wherein said ultraviolet-curing acrylic resin comprises from 35 to 100% by weight of an acrylic resin having an acryloyl group or a methacryloyl group and up to 65% by weight of an acrylic polymerizable monomer based on the total resinous components, and from 0.1 to 5 parts by weight of a photopolymerization initiator per 100 parts by weight of the total resinous components.

* * * * *